United States Patent
Hegeman et al.

(10) Patent No.: US 6,832,617 B2
(45) Date of Patent: *Dec. 21, 2004

(54) DISHWASHER FINE FILTER ASSEMBLY

(75) Inventors: Arjan Johannes Hegeman, Pembroke, NH (US); Gregory Alan Meyer, Taylorsville, KY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/742,548

(22) Filed: Dec. 22, 2000

(65) Prior Publication Data

US 2003/0029781 A1 Feb. 13, 2003

(51) Int. Cl.[7] .............................. B08B 3/00; B01D 39/00
(52) U.S. Cl. ..................... 134/111; 134/58 D; 134/186; 210/411
(58) Field of Search .................... 134/56 D, 57 D, 134/58 D, 104.1, 104.4, 111, 186, 188, 191; 210/167, 314, 411

(56) References Cited

U.S. PATENT DOCUMENTS

| | | | |
|---|---|---|---|
| 4,150,679 A | 4/1979 | Cushing et al. | 134/104.1 |
| 4,392,891 A * | 7/1983 | Meyers | 134/10 |
| 4,848,382 A | 7/1989 | Bertsch et al. | 134/111 |
| 5,165,433 A | 11/1992 | Meyers | 134/104.4 |
| 5,345,957 A | 9/1994 | Cooper et al. | 134/104.1 |
| 5,377,707 A | 1/1995 | Young, Jr. | 134/104.1 |
| 5,499,640 A | 3/1996 | Kirkland | 134/56 D |
| 5,601,660 A | 2/1997 | Jeon et al. | 134/10 |
| 5,630,437 A | 5/1997 | Dries et al. | 134/186 |
| 5,711,326 A | 1/1998 | Thies et al. | 134/104.4 |
| 5,730,805 A | 3/1998 | Bertsch et al. | 134/10 |
| 5,779,812 A | 7/1998 | Thies et al. | 134/10 |
| 5,803,100 A | 9/1998 | Thies | 134/104.4 |
| 5,848,601 A | 12/1998 | Thies | 134/104.4 |
| 5,909,743 A | 6/1999 | Thies et al. | 134/10 |
| 6,103,017 A | 8/2000 | Thies et al. | 134/10 |
| 6,418,943 B1 * | 7/2002 | Miller | 134/104.1 |

FOREIGN PATENT DOCUMENTS

EP    0 842 632 A2    5/1998

* cited by examiner

Primary Examiner—Frankie L. Stinson
Assistant Examiner—Joseph L. Perrin
(74) Attorney, Agent, or Firm—George L. Rideout, Jr. Esq.; Armstrong Teasdale, LLP

(57) ABSTRACT

A fine filter assembly for a dishwasher includes a filter body having an inlet and an outlet located substantially adjacent to one another, and an extended flow path joins the inlet and the outlet so that essentially an entire length of the filter body is used for filtration. The flow path is sloped from the inlet to the outlet and extends substantially 360 radial degrees around a circular outer perimeter of the filter body. Therefore, wash fluid naturally flows from the fine filter inlet to the fine filter outlet all the way around the filter body, and substantially the entire filter body is flushed when the fine filter is drained and a main pump assembly is energized.

20 Claims, 13 Drawing Sheets

DISHWASHER FINE FILTER ASSEMBLY

BACKGROUND OF THE INVENTION

This invention relates generally to dishwashers, and, more particularly, to dishwasher system fine filter systems.

Known dishwasher systems include a main pump assembly and a drain pump assembly for circulating and draining wash fluid within a wash chamber located in a cabinet housing. The main pump assembly feeds washing fluid to various spray arm assemblies for generating washing sprays or jets on dishwasher items loaded into one or more dishwasher racks disposed in the wash chamber. Fluid sprayed onto the dishwasher items is collected in a sump located in a lower portion of the wash chamber, and water entering the sump is filtered through one or more coarse filters to remove soil and sediment from the washing fluid. At least some dishwasher systems further include a fine filter system in flow communication with the main pump assembly to remove soil and sediment of a smaller size than those filtered by the coarse filters. The main pump assembly draws wash fluid from the sump to recirculate in the wash chamber, and the coarse and fine filters are used to continuously filter the water in the sump during the re-circulation process.

At least one known fine filter assembly includes a fine filter having a filter screen disposed over a top of a circular filter body. The filter body includes a radially extending water feed located substantially 180 radial degrees from a filter drain. From the water feed the filter body sloped downward to the drain, and then slopes upwardly from the drain toward the other side of the water feed. In other words, the filter body essentially includes two substantially equal portions divided by the water feed, each of which slope downward toward the drain from approximately an equal elevation. However, this is less than desirable for cleaning the filter body and sweeping soil into the fine filter drain. Specifically, when the main pump assembly is running and the fine filter is drained to flush the filter body and the filter screen, only the portion of the filter body that includes the water feed is flushed. Consequently, it can be difficult to remove soil from the portion of the filter body that is opposite the water feed.

BRIEF SUMMARY OF THE INVENTION

In an exemplary embodiment, a fine filter assembly for a dishwasher includes a filter body having an inlet and an outlet. The inlet is located substantially adjacent the outlet, and an extended flow path joins the inlet and the outlet so that essentially an entire length of the filter body is used for filtration. The flow path is sloped from the inlet to the outlet and extends substantially 360 radial degrees around a circular outer perimeter of the filter body. Therefore, wash fluid naturally flows from the fine filter inlet to the fine filter outlet all the way around the filter body, and substantially the entire filter body is flushed when the fine filter is drained and a main pump assembly is energized. A more efficient fine filter assembly is therefore provided.

DETAILED DESCRIPTION OF THE INVENTION

Figure 1:
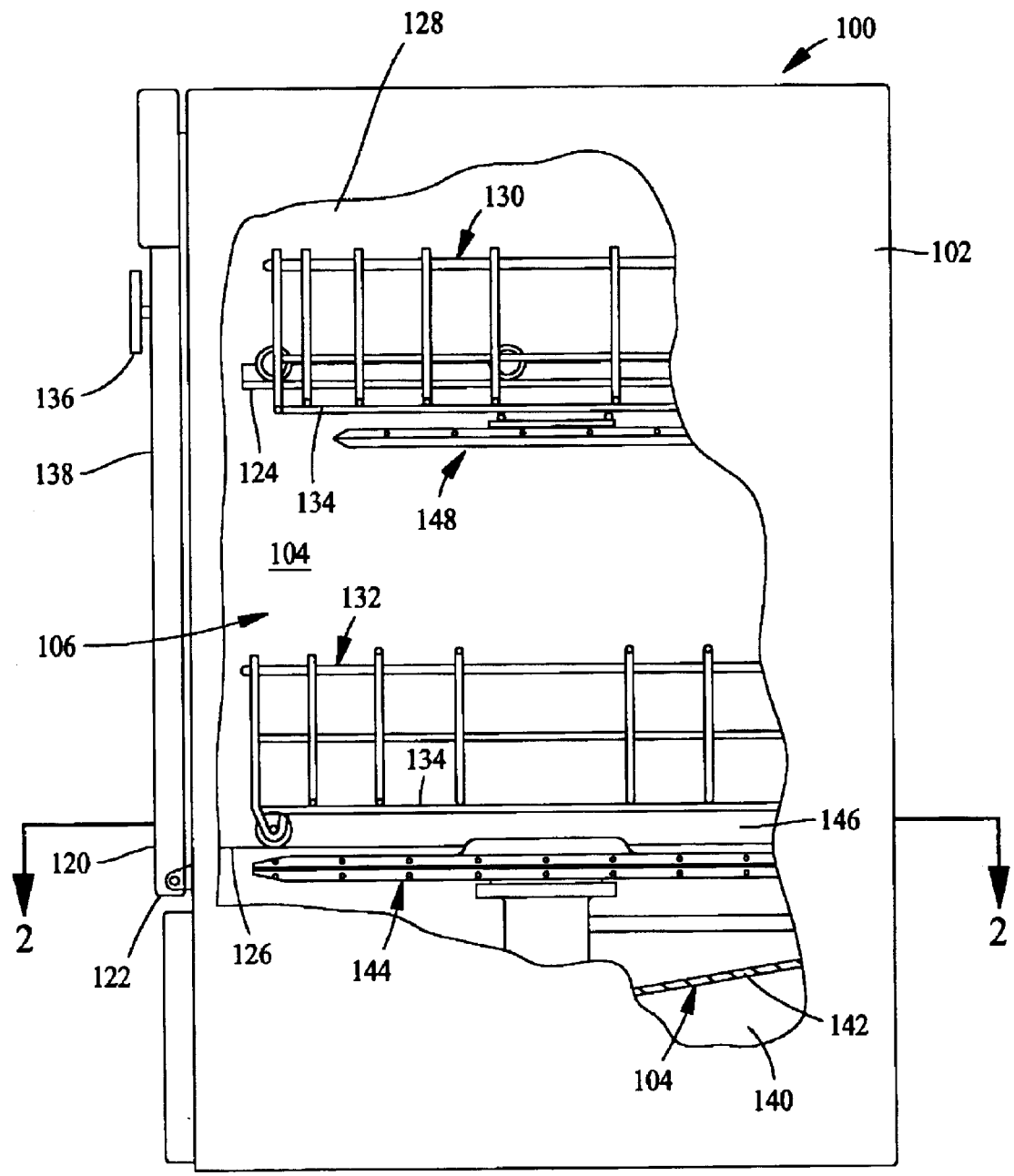
FIG. 1 is a side elevational view of an exemplary dishwasher system partially broken away.

FIG. 1 is a side elevational view of an exemplary domestic dishwasher system 100 partially broken away, and in which the present invention may be practiced. It is contemplated, however, that the invention may be practiced in other types of dishwashers and dishwasher systems beyond dishwasher system 100 described and illustrated herein. Accordingly, the following description is for illustrative purposes only, and the invention is in no way limited to use in a particular type of dishwasher system, such as dishwasher system 100.

Dishwasher 100 includes a cabinet 102 having a tub 104 therein and forming a wash chamber 106. Tub 104 includes a front opening (not shown in FIG. 1) and a door 120 hinged at its bottom 122 for movement between a normally closed vertical position (shown in FIG. 1) wherein wash chamber is sealed shut for washing operation, and a horizontal open position (not shown) for loading and unloading of dishwasher contents. Upper and lower guide rails 124, 126 are mounted on tub side walls 128 and accommodate upper and lower roller-equipped racks 130, 132, respectively. Each of upper and lower racks 130, 132 is fabricated from known materials into lattice structures including a plurality of elongate members 134, and each rack 130, 132 is adapted for movement between an extended loading position (not shown) in which the rack is substantially positioned outside wash chamber 106, and a retracted position (shown in FIG. 1) in which the rack is located inside wash chamber 106. Conventionally, a silverware basket (not shown) is removably attached to lower rack 132 for placement of silverware, utensils, and the like that are too small to be accommodated by upper and lower racks 130, 132.

A control input selector 136 is mounted at a convenient location on an outer face 138 of door 120 and is coupled to known control circuitry (not shown) and control mechanisms (not shown) for operating a fluid circulation assembly (not shown in FIG. 1) for circulating water and dishwasher fluid in dishwasher tub 104. The fluid circulation assembly is located in a machinery compartment 140 located below a bottom sump portion 142 of tub 104, and its construction and operation is explained in detail below.

A lower spray-arm-assembly 144 is rotatably mounted within a lower region 146 of wash chamber 106 and above tub sump portion 142 so as to rotate in relatively close proximity to lower rack 132. A mid-level spray-arm assembly 148 is located in an upper region of wash chamber 106 and is located in close proximity to upper rack 130 and at a sufficient height above lower rack 132 to accommodate a largest item, such as a dish or platter (not shown), that is expected to be placed in lower rack 132 and washed in dishwasher system 100. In a further embodiment, an upper spray arm assembly (not shown) is located above upper rack 130 at a sufficient height to accommodate a tallest item expected to be placed in upper rack 130, such as a glass (not shown) of a selected height.

Lower and mid-level spray-arm assemblies 144, 148 and the upper spray arm assembly are fed by the fluid circulation assembly, and each spray-arm assembly includes an arrangement of discharge ports or orifices for directing washing liquid onto dishes located in upper and lower racks 130, 132, respectively. The arrangement of the discharge ports in at least lower spray-arm assembly 144 provides a rotational force by virtue of washing fluid flowing through the discharge ports. The resultant rotation of lower spray-arm assembly 144 provides coverage of dishes and other dishwasher contents with a washing spray. In various alternative embodiments, mid-level spray arm 148 and/or the upper spray arm are also rotatably mounted and configured to generate a swirling spray pattern above and below upper rack 130 when the fluid circulation assembly is activated.

Figure 2:
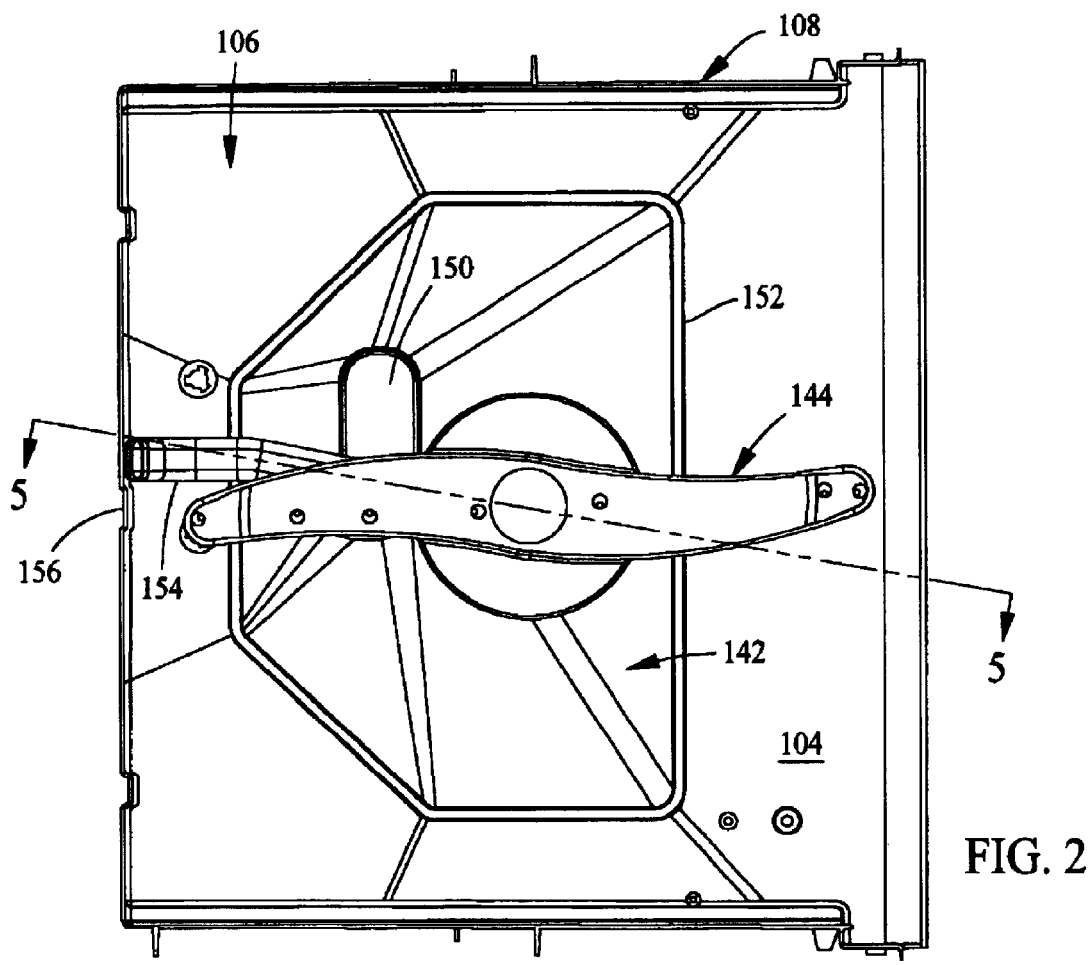
FIG. 2 is a top plan view of a portion of the dishwasher system shown in FIG. 1 along line 2—2.

FIG. 2 is a top plan view of a dishwasher system 100 just above lower spray arm assembly 144. Tub 104 is generally downwardly-sloped beneath lower spray arm assembly 144 toward tub sump portion 142, and tub sump portion is generally downwardly sloped toward a sump 150 in flow communication with the fluid circulation assembly (not shown in FIG. 2). Tub sump portion 142 includes a six-sided outer perimeter 152 having a shape reminiscent of a baseball home plate. Lower spray arm assembly is substantially centered within tub 104 and wash chamber 106, off-centered with respect to tub sump portion 142, and positioned above tub 104 and tub sump portion 142 to facilitate free rotation of spray arm 144.

Tub 104 and tub sump portion 142 are downwardly sloped toward sump 150 so that as water sprayed from lower spray arm assembly 144, mid-level spray arm assembly 148 (shown in FIG. 1) and the upper spray arm assembly (not shown) is collected in tub sump portion 142 and directed toward sump 150 for filtering and re-circulation, as explained below, during a dishwasher system wash cycle. In addition, a conduit 154 extends beneath lower spray arm assembly 144 and is in flow communication with the fluid circulation assembly. Conduit 154 extends to a back wall 156 of wash chamber 106, and upward along back wall 156 for feeding wash fluid to mid-level spray arm assembly 148 and the upper spray arm assembly.

Figure 3:
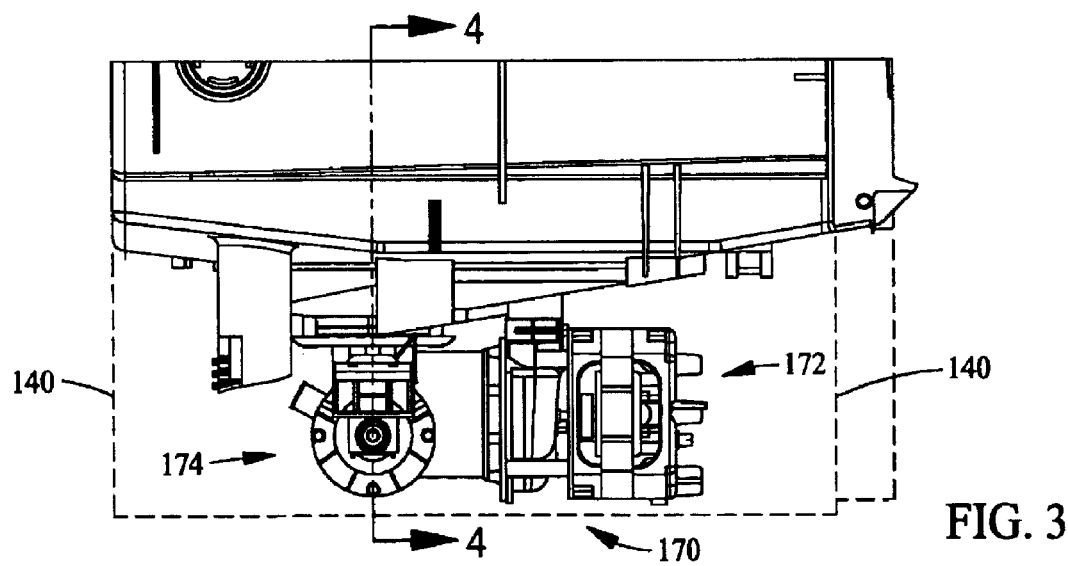
FIG. 3 is a partial side elevational view of the portion of the dishwasher system shown in FIG. 2.

FIG. 3 illustrates fluid circulation assembly 170 extending below wash chamber 106 (shown in FIGS. 1 and 2) in machinery compartment 140 (shown in phantom in FIG. 3). Fluid circulation assembly 170 includes a main pump assembly 172 established in flow communication a building plumbing system water supply pipe (not shown) and a drain pump assembly 174 in fluid communication with sump 150 (shown in FIG. 2) and a building plumbing system drain pipe (not shown).

Figure 4:
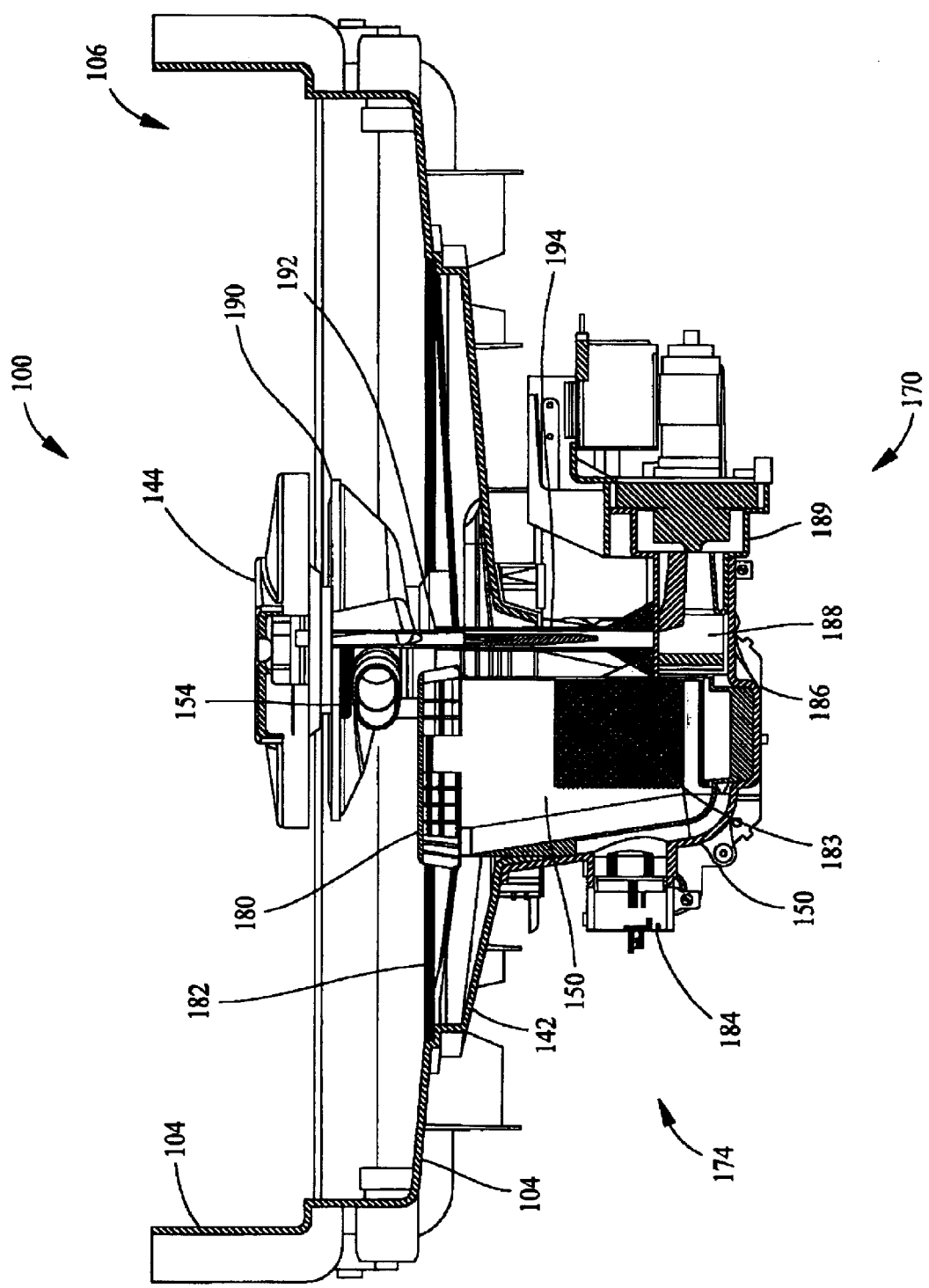
FIG. 4 is a cross sectional schematic view of the portion of the dishwasher system shown in FIG. 3 along line 4—4.

FIG. 4 is a cross sectional schematic view of dishwasher system 100, and more specifically of fluid circulating assembly 170 through drain pump assembly 174. Tub 104 is downwardly sloped toward tub sump portion 142, and tub sump portion is downwardly sloped toward sump 150. As wash fluid is pumped through lower spray arm assembly 144, and further delivered to mid-level spray arm assembly 148 (shown in FIG. 1) and the upper spray arm assembly (not shown), washing sprays are generated in wash chamber 106, and wash fluid collects in sump 150.

Sump 150 includes a cover 180 to prevent larger objects from entering sump 150, such as a piece of silverware or another dishwasher item that is dropped beneath lower rack 132 (shown in FIG. 1). A course filter 182 is located adjacent sump 150 to filter wash fluid for sediment and particles of a predetermined size before flowing into sump 150 through a course inlet filter 183, and a turbidity sensor is coupled to sump 150 and used in accordance with known techniques to sense a level of sediment in sump 150 and to initiate a sump purge cycle when a turbidity level in sump 150 approaches a predetermined threshold.

A drain check valve 186 is established in flow communication with sump 150 and opens or closes flow communication between sump 150 and a drain pump inlet 188. A drain pump 189 is in flow communication with drain pump inlet 188 and includes an electric motor for pumping fluid at inlet 188 to a pump discharge (not shown in FIG. 4) and ultimately to a building plumbing system drain (not shown). When drain pump is energized, a negative pressure is created in drain pump inlet 188 and drain check valve 186 is opened, allowing fluid in sump 150 to flow into fluid pump inlet 188 and be discharged from fluid circulation assembly 170.

As explained further below, a fine filter assembly 190 is located below lower spray arm assembly and above tub sump portion 142. As wash fluid is pumped into lower spray arm 144 to generate a washing spray in wash chamber 106, wash fluid is also pumped into fine filter assembly 190 to filter wash fluid sediment and particles of a smaller size than coarse filters 182 and 183. Sediment and particles incapable of passing through fine filter assembly 190 are collected in fine filter assembly 190 and placed in flow communication with a fine filter drain tube 192 received in a fine filter drain docking member 194, which is, in turn, in flow communication with drain pump inlet 188. Thus, when pressure in fine filter assembly 190 exceeds a predetermined threshold, thereby indicating that fine filter assembly is clogged with sediment, drain pump 189 can be activated to drain fine filter assembly. Down jets (not shown) of lower spray arm assembly 144 spray fluid onto fine filter assembly 190 to clean fine filter assembly during purging or draining of fine filter assembly 190.

Figure 5:
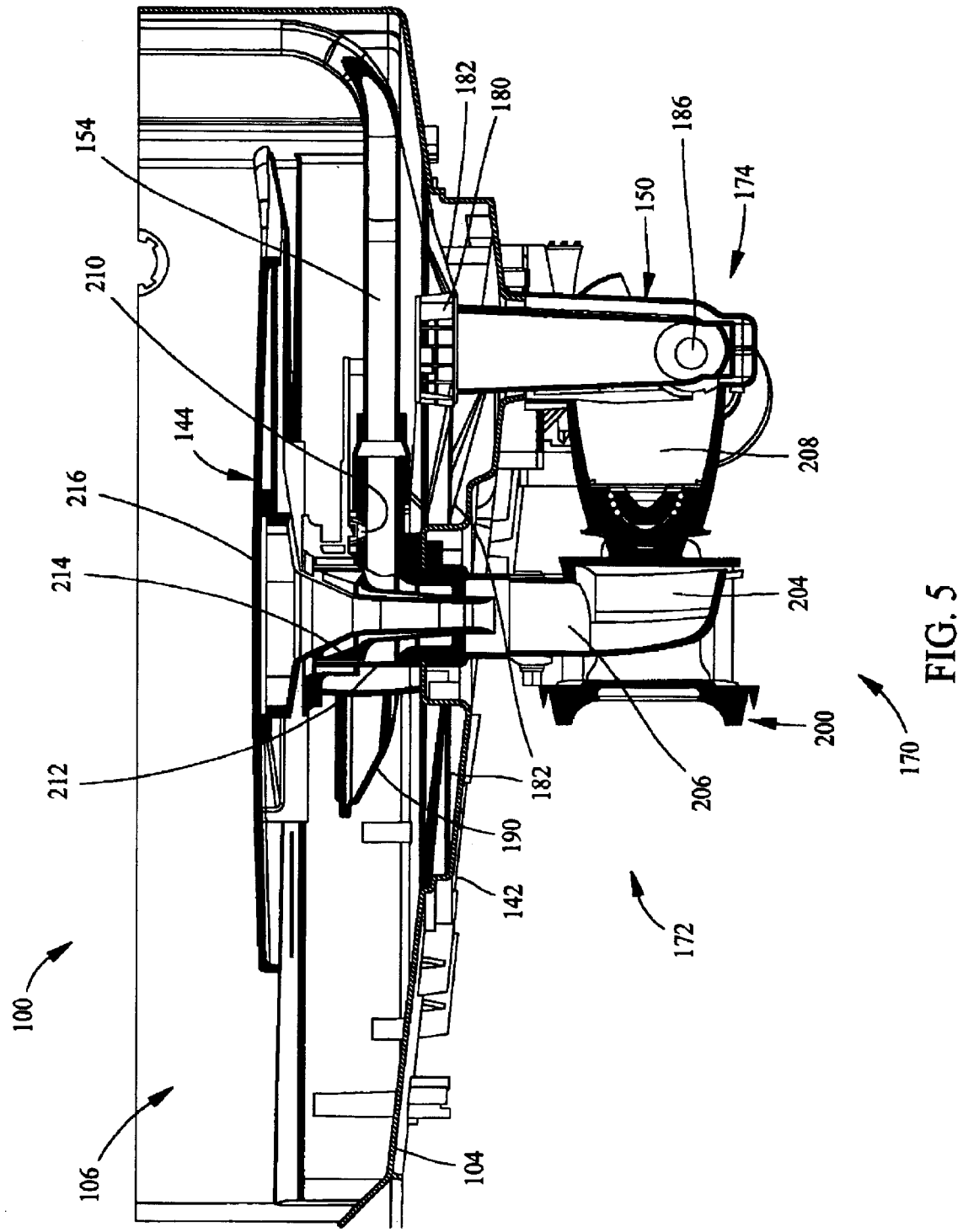
FIG. 5 is a cross sectional schematic view of the portion of the dishwasher system shown in FIG. 2 along line 5—5.

FIG. 5 is a cross sectional schematic view of dishwasher system 100, and more specifically of main pump assembly 172. A main pump 200 includes a main pump cavity 204 and an electric motor for pumping fluid from main pump cavity 204 to a main pump discharge 206. Main pump cavity is in flow communication with a building plumbing system supply line (not shown) through a water valve (not shown) and is also in flow communication with sump 150 via a re-circulation passage 208 extending between main pump assembly 172 and drain pump assembly 174.

From main pump discharge 206, fluid is directed partly to conduit 154 for supplying wash fluid to mid-level spray arm assembly 148 (shown in FIG. 1) and to the upper spray arm assembly (not shown), partly to fine filter assembly 190 through a fine filter inlet 210 integral to conduit 154, and partly to lower spray arm assembly 144. Lower spray arm assembly includes a spray arm hub 212 that receives a venturi insert 214 for generating a swirling water flow through spray arm hub 212 and imparting rotary motion to a lower spray arm 216. Fluid is sprayed through a plurality of fluid discharge ports (not shown in FIG. 5) to generate a swirling spray pattern in wash chamber 106.

Wash fluid is collected in tub 104 and tub sump portion 142 and directed toward sump 150. Fluid is filtered through coarse filter 182 and coarse inlet filter 183 and flows back to main pump cavity 204 via re-circulation passage 208. From main pump cavity 204, fluid is re-circulated to lower spray arm assembly 144, conduit 154 to upper regions of dishwasher chamber 106, and to fine filter assembly 190 for further filtering. Fluid is again collected in sump 150 and the re-circulating process continues until a purge cycle is initiated to energize drain pump 189 (shown in FIG. 4) and open drain check valve 186 (shown in FIG. 4) to pump fluid out of dishwasher system 100. In one embodiment, fluid circulation assembly 170 is drained and flushed by operating main pump assembly 172 and drain pump assembly 174 simultaneously, as explained further below.

Figure 6:
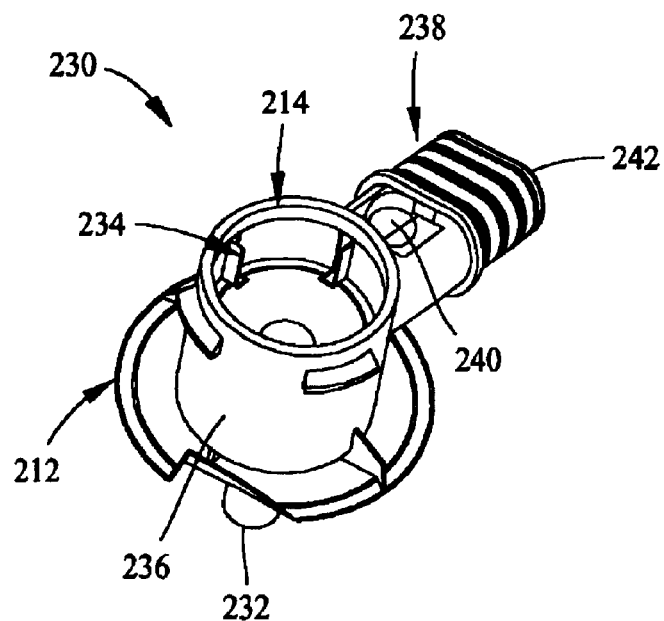
FIG. 6 is a perspective view of a spray arm hub assembly for the dishwasher system shown in FIGS. 1–5.

FIG. 6 is a perspective view of an exemplary lower spray arm hub assembly 230 of fluid circulation assembly 170 (shown in FIGS. 3–5). Hub assembly 230 includes spray arm hub 212 and venturi insert 214 therein. Venturi insert 214 includes a lower end 232 in flow communication with main pump discharge 206 (shown in FIG. 5) and an upper end 234 in flow communication with lower spray arm assembly 144 (shown in FIGS. 2–5). Hub 212 includes a longitudinally extending hub base 236, a laterally extending conduit coupling member 238 extending from hub base 232. Conduit coupling member 238 extends substantially perpendicularly to hub base 232, includes a fine filter inlet port 240, and includes a serrated end 242 for sealing engagement with conduit 154 (shown in FIGS. 2–5) that delivers wash fluid to mid-level spray arm assembly 144 (shown in FIG. 1) and/or the upper spray arm assembly (not shown).

Figure 7:
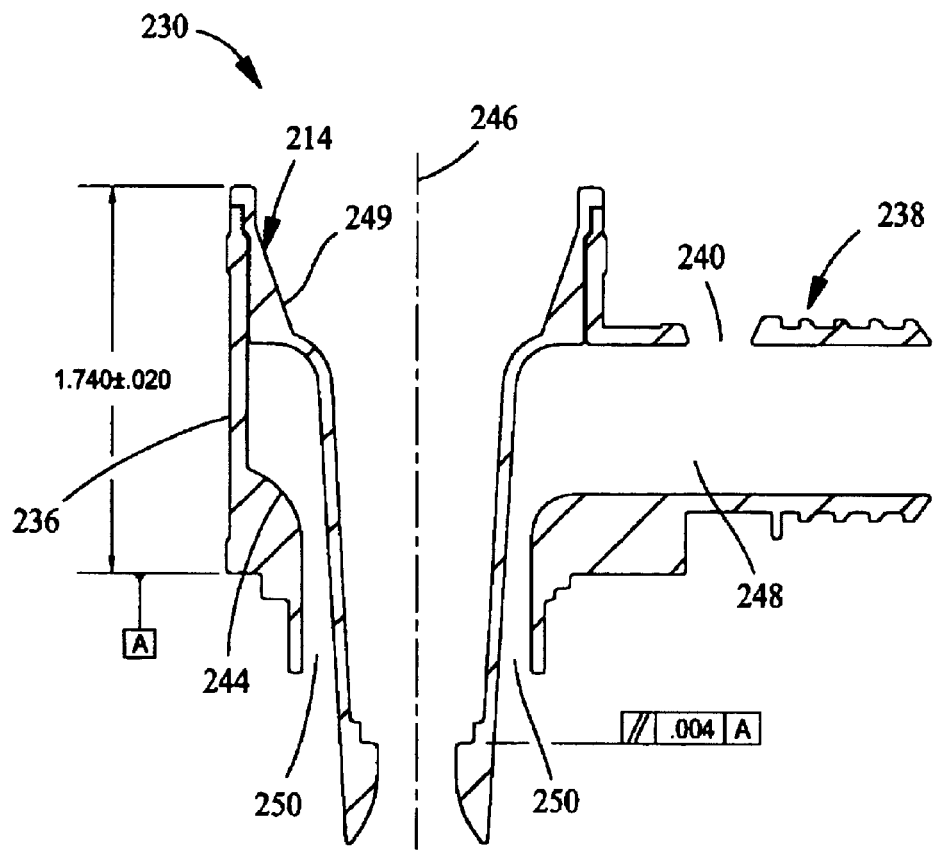
FIG. 7 is a cross sectional view of the spray arm assembly shown in FIG. 6.

FIG. 7 is a cross sectional view of spray arm assembly 230 and illustrating fluid paths therethrough. Hub base 236 includes a central bore 244 extending therethrough along a longitudinal axis 246, and a conduit feed passage 248 in flow communication with central bore 244. Venturi insert 214 extends through hub base central bore and also includes a central bore 249 extending along hub base longitudinal axis 246. Venturi insert central bore 249 is shaped to create a negative pressure at a bearing surface (not shown in FIG. 7) of lower spray arm assembly 144 (shown in FIGS. 1–5) and therefore eliminate fluid leaks at the bearing surface.

Venturi insert central bore 249, however, is smaller than hub base central bore 246 so that a fluid bypass channel 250 is created around venturi insert 214 so that wash fluid may be fed to both lower spray arm assembly 144 through venturi insert central bore 248 and to conduit feed passage 248 through bypass channel 250. Further, conduit feed channel 248 includes fine filter inlet port 240 for feeding fluid to fine filter assembly 190 (shown in FIGS. 4 and 5). Consequently, when hub assembly 230 is placed in flow communication with main pump discharge 206 (shown in FIG. 5) and when conduit coupling member 238 is coupled to conduit 154, wash fluid can be fed to lower spray arm assembly 144, conduit 154, and to fine filter assembly 190 through a single passage in tub 104 (shown in FIGS. 1–5), thereby eliminating potential leaks from a plurality of separate feeds through tub 104 in conventional dishwasher systems. In addition, by feeding fine filter from conduit feed passage 248 rather than directly from main pump discharge 206, fine filter inlet pressure is lowered, which reduces a frequency of premature draining of sump 150 (shown in FIGS. 2–5) due to pressure conditions in fine filter assembly.

Still further, and as best depicted in FIG. 5, venturi insert 214 of hub assembly 230 extends through the single opening in tub 104 to establish flow communication with main pump discharge 206. As such, lower spray arm 144 is of a relatively compact height in relation to known lower spray arm assemblies, and consequently less space in wash chamber 106 is occupied by lower spray arm assembly 144.

Figure 8:
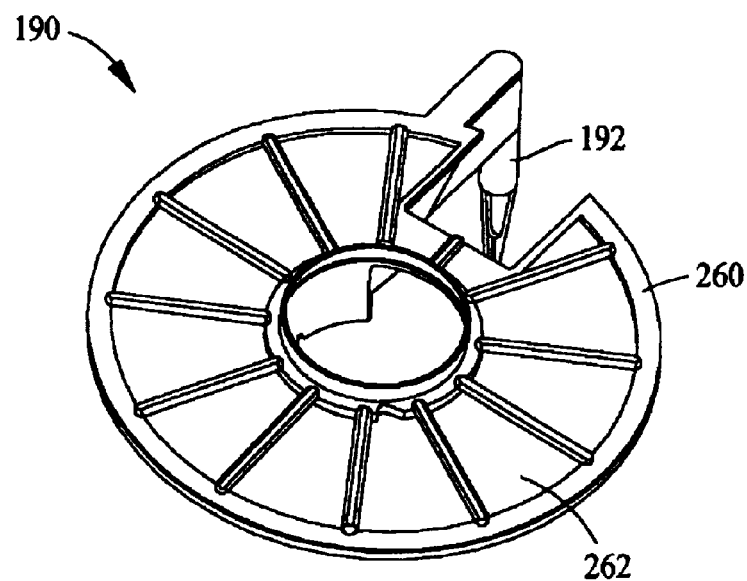
FIG. 8 is a perspective view of a fine filter assembly for the dishwasher system shown in FIGS. 1–5.

FIG. 8 is a perspective view of an exemplary fine filter assembly 190 including a filter body 260 and a filter screen grid 262 coupled to body 260 for filtering particles in wash fluid of a pre-selected size determined by openings in grid 262. Body 260 includes a fluid inlet (not shown in FIG. 8) and a drain tube 192.

Figure 9:
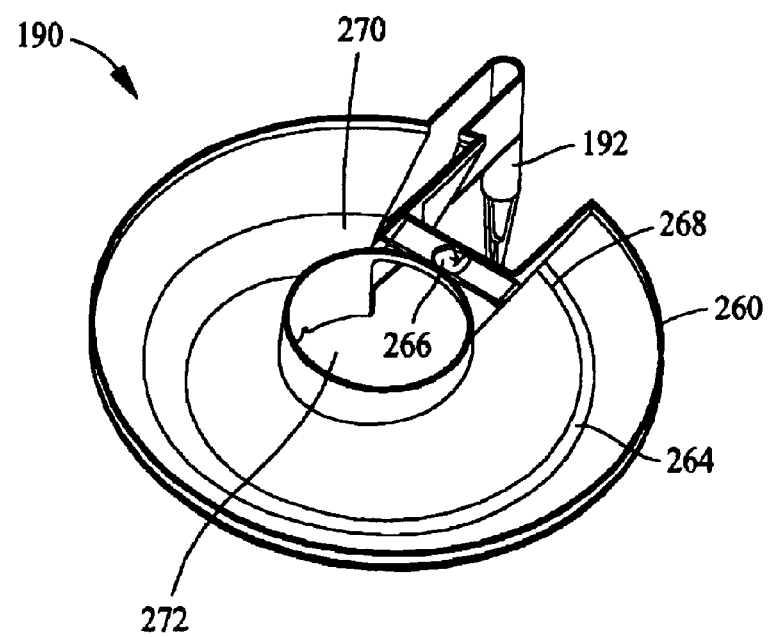
FIG. 9 is a perspective view of the fine filter assembly shown in FIG. 8 with parts removed.

FIG. 9 is a perspective view of fine filter assembly 190 with filter screen grid 262 (shown in FIG. 8) removed. Body 260 is generally bowl shaped, and includes a soil accumulation trough 264 extending between fluid inlet 266 and a fluid outlet (not shown in FIG. 1) in flow communication with drain tube 192. Soil accumulating trough includes a first end 268 adjacent fluid inlet 266 and a second end 270 adjacent the fluid outlet, and is generally sloped downwardly from first end 268 to second end 270 along a substantially helical path between first end 268 and second end 270 so that second end 270 is deeper than first end 260. First end 268 and second 270 are situated relatively close to one another so that soil accumulating trough extends radially for nearly 360° along the helical path between first end 268 and second end 270. In addition, soil accumulating trough 264 grows wider toward second end 270 and the fluid outlet to accommodate a relatively greater amount of sediment at second end 270 than at first end 268.

It is believed that the shape and slope of soil accumulating trough 264 provides enhanced filtering performance relative to known dishwasher fine filter systems. A natural flow path is provided toward drain tube 192 that facilitates cleaning of fine filter assembly 190. Soil is directed to drain tube 192 with relative ease, thereby facilitating use of more efficient use of drain pump inlet 188 (shown in FIG. 4) as a soil collection chamber during wash cycles. In addition, because soil accumulating trough 264 extends for nearly 360 radial degrees along its helical path in fine filter body 260, a full length of filter body 260 is utilized for downward sloped soil accumulation between the wash fluid inlet 266 and the outlet. Consequently, the entire filter is efficiently flushed during a drain cycle.

A central bore 272 extends through body 260 and receives hub assembly 230 (shown in FIGS. 6 and 7). Fluid inlet 266 is placed in flow communication with fine filter inlet port 240 of hub conduit coupling member 238 (shown in FIG. 6 and 7) so that wash fluid from main pump discharge 206 (shown in FIG. 5) is fed to fine filter assembly 190 via inlet port 240 and fluid inlet 266. As explained below, flow through drain tube 192 is prevented in one embodiment by a normally closed valve (not shown in FIG. 9) when main pump assembly 172 is running. Therefore, line filter assembly is pressurized by fluid flow from main pump assembly 172, and wash fluid percolates through filter screen grid 262 (shown in FIG. 8) and returns to sump 150 (shown in FIGS. 2–4) for re-circulation in wash chamber 106 (shown in FIGS. 1–5). Soil and fluid sediment too large to pass through filter screen grid 262 is accumulated in soil accumulation trough 264 and directed toward second end 270 and drain tube 192. As filter screen 162 clogs with sediment, pressure rises in fine filter assembly 190. In one embodiment, pressure in fine filter assembly 190 is monitored and used to trigger a purge cycle of line filter assembly 190 to drain and backwash the fine filter.

Figure 10:
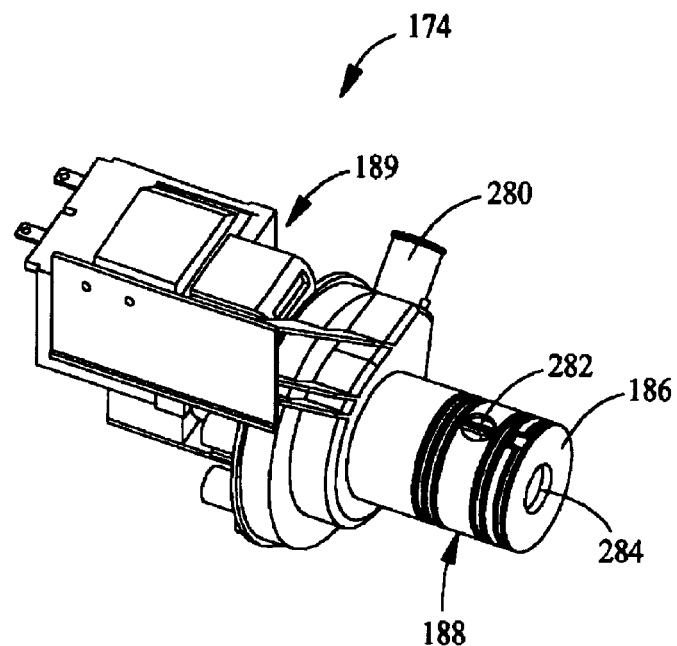
FIG. 10 is a perspective view of a drain pump assembly shown in FIGS. 3–5.

FIG. 10 is a perspective view of an exemplary drain pump assembly 174 including drain pump inlet 188, drain pump 189 and a drain pump discharge 280 for coupling to a building plumbing system drain (not shown). Drain pump inlet 188 includes a fine filter drain suction inlet 282 to be placed in flow communication with fine filter drain tube 192 (shown in FIGS. 4, 8 and 9), a sump suction inlet 284 to be placed in flow communication with sump 150 (shown in FIGS. 2–5), and drain check valve 186 for regulating flow from sump 150 into drain pump inlet 188.

Figure 11:
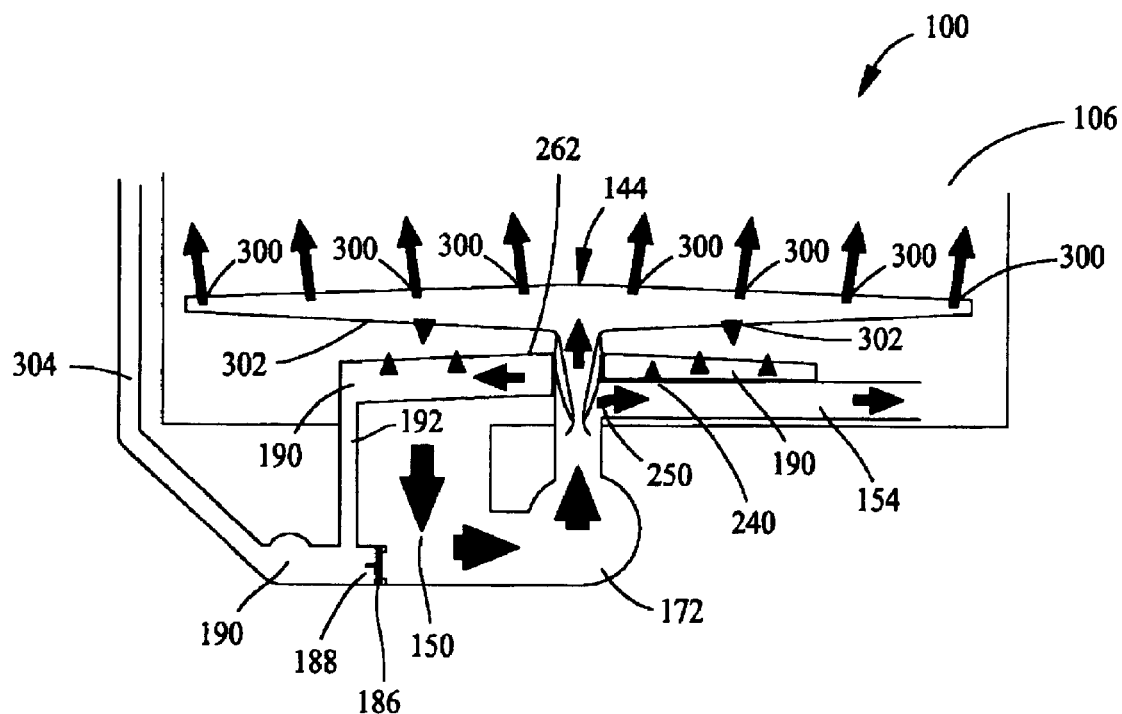
FIG. 11 is a functional schematic of the dishwasher system shown in FIGS. 1–5 in a first mode of operation.

FIG. 11 is a functional schematic of dishwasher system 100 as described above in a first mode of operation wherein main pump assembly 172 is running to wash dishwasher contents. Fluid flow is generally indicated by the solid arrows. As seen from FIG. 11, fluid flows from main pump 172 to lower spray arm assembly 144 through hub venturi insert 214 and through a plurality of upwardly directed fluid discharge ports 300 therein, as well as a plurality of downwardly directed fluid discharge ports 302 to create a downward spray on fine filter assembly 190. Fluid also flows from main pump assembly 172 through hub bypass channels 250, into conduit 154 and into fine filter assembly 190 through fine filter inlet port 240. Fluid in conduit 154 is distributed to upper regions of wash chamber 106 and fluid in fine filter assembly 190 either flows through fine filter assembly filter screen 262 or into fine filter drain tube 192 and into drain pump inlet 188. Fluid flows upwardly into drain line 304 until a pressure from a fluid column in drain line 304 counterbalances operating pressure in fine filter assembly 190. Hence, as pressure in fine filter assembly increases, so does a height of the fluid column in drain tube 304, up to a maximum height determined the height of drain line 304. In an exemplary embodiment, drain line extends 304 upwardly about 32 inches above drain pump inlet 188 to create adequate back pressure in drain line 304 to prevent premature draining of fluid from fluid circulation dishwasher 100. In alternative embodiments, greater or lesser drain line heights and configurations are employed to achieve similar benefits.

Filtered fluid is distributed into wash chamber 106, collected in sump 150 and filtered again by course filters 182, 183 (shown in FIGS. 4 and 5). Check valve 186 is kept closed by pressure in filter drain tube 192 and a drain line 304, preventing soil from fine filter assembly 190 from entering sump 150 and further preventing fluid in sump 150 from entering drain pump inlet 188. Fluid in sump 150 is therefore re-circulated as described above by main pump assembly 172.

Figure 12:
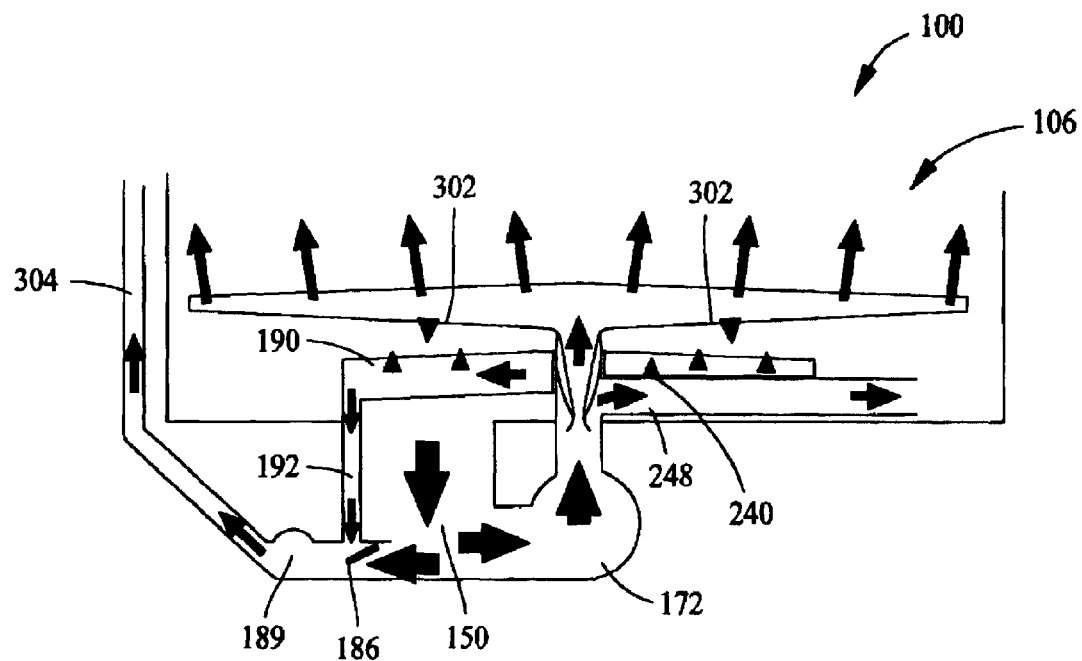
FIG. 12 is a functional schematic of the dishwasher system shown in FIGS. 1–5 in a second mode of operation.

FIG. 12 is a functional schematic of dishwasher system 100 in a second mode of operation wherein a drain cycle is initiated and main pump assembly 172 and drain pump 189 are simultaneously operated for a predetermined time period to drain sump 150 and flush fine filter assembly 190. As noted previously, pressure in fine filter is lowered due to indirect fluid feed from main pump assembly 172 through conduit feed passage 248 and fine filter inlet passage 240. Because of the lower pressure in fine filter assembly 190, it is possible to activate drain pump 189 and still open drain check valve 186, despite the fact that main pump assembly 172 is running. Therefore, when drain pump 189 is energized and check valve 186 is opened, water in sump 150 is partly drained and partly re-circulated. Also, when drain check valve 186 is opened, fine filter assembly 190 receives both an inlet flow from conduit feed passage 248 and fine filter water inlet 240, and a backflush from lower spray arm downwardly directed fluid discharge ports 302. Backflushing of fine filter assembly aids in clearing filter screen grid 262 (shown in FIG. 8) and appreciably improves soil removal from fine filter assembly during a drain cycle. At a predetermined time, dependant upon main pump assembly and drain pump assembly characteristics, main pump assembly 172 is de-energized to avoid surging noises due to low water levels in sump 150.

Figure 13:
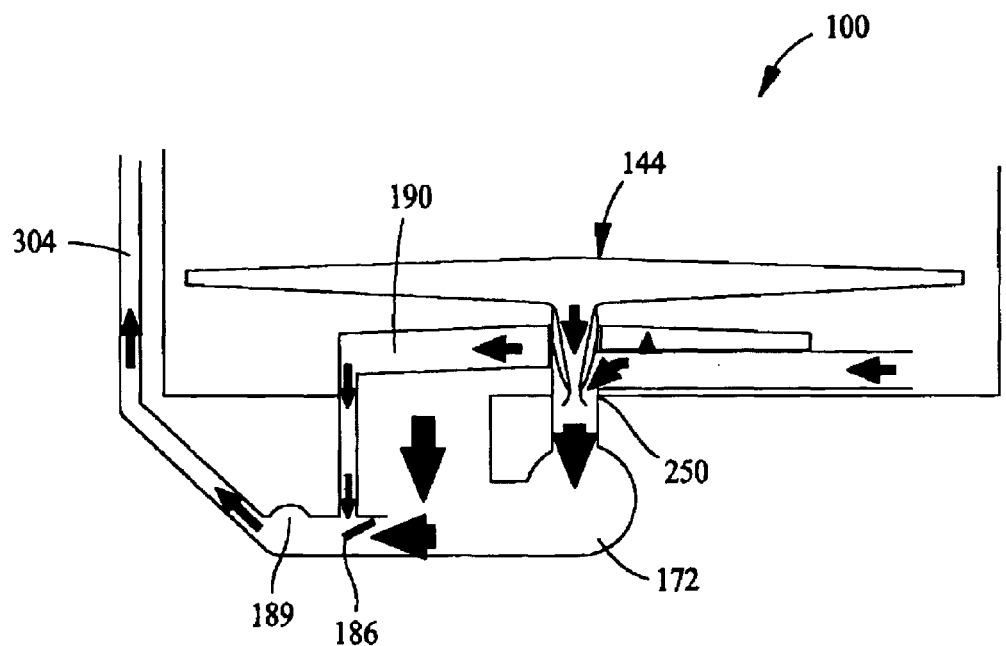
FIG. 13 is a functional schematic of the dishwasher system shown in FIGS. 1–5 in a third mode of operation.

FIG. 13 is a functional schematic of dishwasher system in a third mode of operation wherein a drain cycle continues after main pump assembly 172 is de-energized. Drain pump 189 pumps remaining fluid in fine filter assembly 190, lower spray arm assembly 144, conduit 154, sump 150 and main pump assembly 172 through check valve 186 and into drain line 304. When fluid has been removed from dishwasher system 100, drain pump 189 is de-energized, and drain check valve 186 is again closed. In a further embodiment, another check valve (not shown) or another coarse filter (not shown) is used to prevent soiled water from drain line 304 from flowing backward into fine filter assembly 190.

Figure 14:
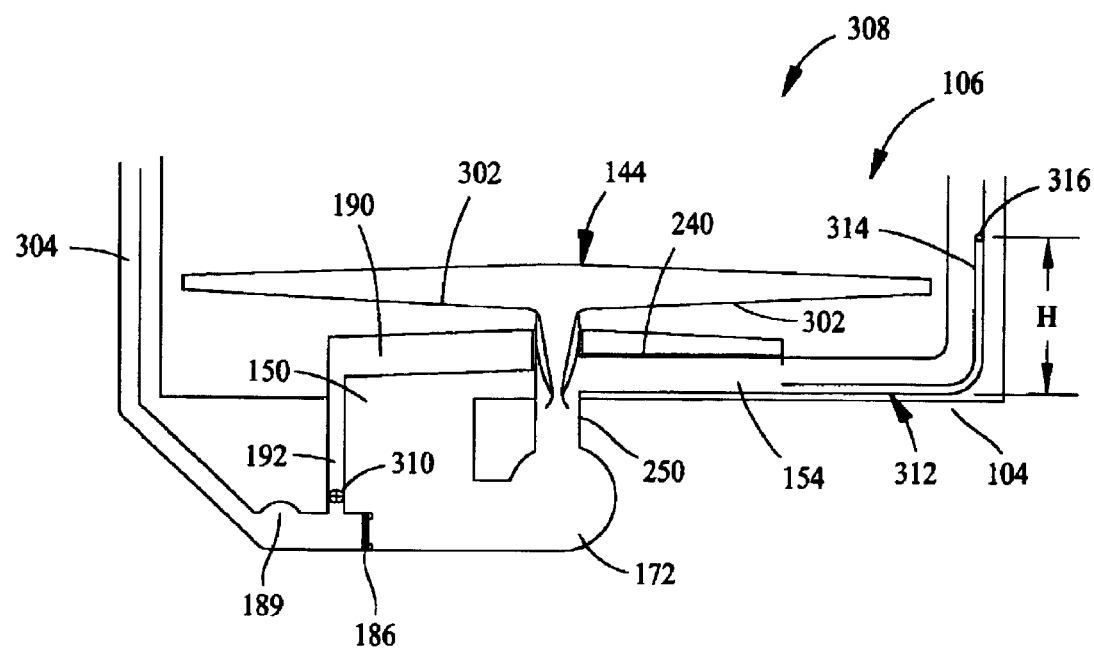
FIG. 14 is a functional schematic of a second embodiment of a dishwasher system shown in FIGS. 1–5 including a fine filter pressure relief.

FIG. 14 is a functional schematic of second embodiment of a dishwasher system 308 wherein common components of dishwasher system 100 are indicated with like reference characters. Dishwasher system 308 includes a pressure actuated fine filter check valve 310 for regulating flow through fine filter drain tube 192. Fine filter check valve 310 is normally closed so that fine filter assembly 190 is pressurized. Wash fluid pumped into fine filter assembly 190 may only exit fine filter assembly through fine filter screen grid 262 (shown in FIG. 8). While indirect feeding of fine filter assembly 190 through conduit feed passage 248 and fine filter inlet passage 240, rather than directly from main pump assembly 172 provides a reduced pressure in fine filter assembly 190, as filter screen grid 262 clogs with sediment, pressure in fine filter assembly 190 rises.

Unlike known fine filter assemblies including a pressure relief port integral to fine filter assembly itself, a pressure relief tube 312 is provided in flow communication with fine filter assembly 190 to prevent pressure in fine filter assembly 190 from exceeding a predetermined level. In one embodiment, pressure relief tube extends adjacent conduit 154 that feeds mid-level spray arm assembly 148 (shown in FIG. 1) and the upper spray arm assembly (not shown) and includes a vertical portion 314 that extends upwardly for a height H that is less than a height of upwardly extending drain line 304. Vertical portion 314 includes an open top 316 and hence forms a standpipe to regulate fluid pressure in fine filter assembly 190. As pressure rises in fine filter assembly 190, fluid flows into pressure relief tube 312 and begins to rise in vertical portion 314. Pressure in fine filter assembly 190 is therefore balanced by the fluid column in relief tube vertical portion 314. When pressure in fine filter assembly 190 is sufficient to force fluid the full height H in vertical portion 314, fluid overflows vertical portion 314 and through open top 316.

Pressure may therefore rise in fine filter assembly 190 up to a maximum pressure, determined by height H of the fluid column in vertical portion, and the maximum pressure is then maintained in fine filter assembly 190. Pressure relief tube open top 316 is distanced from downwardly directed fluid discharge ports 302 of lower spray arm assembly 144, thereby avoiding possible pressure effects of operation of lower spray arm assembly 144 that could compromise pressure relief in fine filter assembly 190. Also, the location of pressure relief tube 312 alongside conduit 154 and near a vertical wall of tub 104 renders pressure relief tube open top 316 less vulnerable to soiled fluid re-entering the wash system. Still further, because height H of pressure relief tube is less than a height of drain line 304, fluid flows through open top 316 of pressure relief tube 314 rather than continuing to rise in drain line 304 and eventually flowing into a sewer system (not shown).

A relatively simple and reliable pressure relief system is therefore provided that is believed to be more effective than known fine filter pressure relief systems including pressure relief openings in a top of the fine filter.

In further embodiments, enhanced fine filter pressure regulation is achieved with optimization of main pump assembly 172, optimization of lower spray arm assembly, optimization of downwardly directed fluid discharge ports 302, optimization of fine filter assembly 190 geometry and flow paths, flow sensors, and/or drain line 304 water level sensors (not shown). By monitoring conditions in fine filter assembly 190 and/or drain line 304, drain pump assembly 174 may be activated to open check valves 186 and 310 to drain fine filter assembly 190 and sump 150.

Fine filter drain tube check valve 310 facilitates pressure regulation in fine filter assembly and prevents fluid in drain line 304 from flowing back into fine filter assembly 190 when main pump assembly 172 is de-energized. It is appreciated, however, that the benefits of the above-described fine filter pressure relief system, may be achieved in the absence of filter drain check valve 310.

Figure 15:
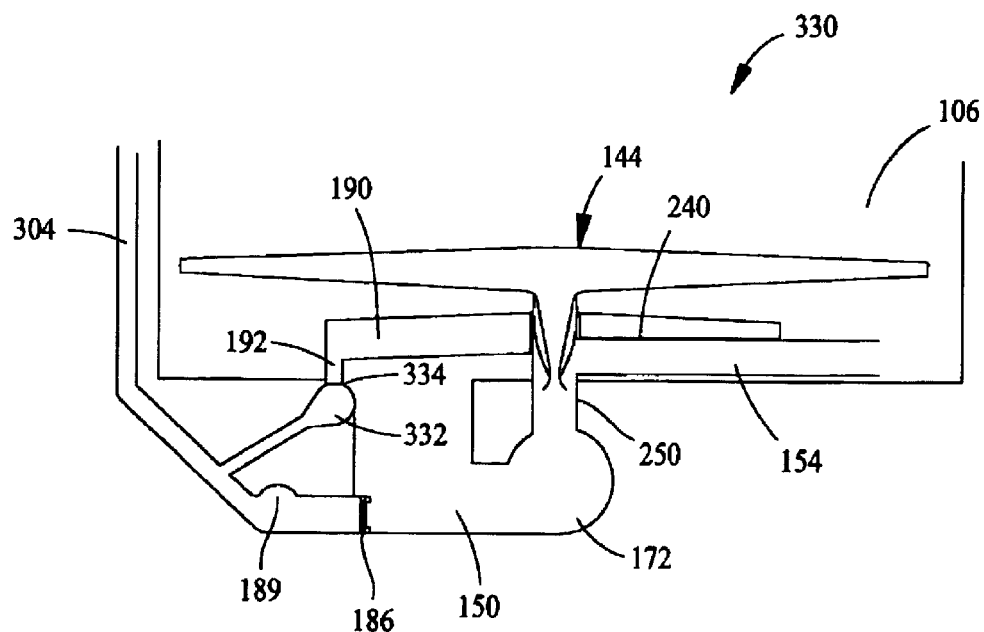
FIG. 15 is a functional schematic of a third embodiment of a dishwasher system.

FIG. 15 is a functional schematic of a third embodiment of a dishwasher system 330 wherein common elements of dishwasher system 100 are indicated with like reference characters. Dishwasher system 330 includes, in addition to drain pump 189, a separate fine filter drain pump 332 in flow communication with fine filter assembly drain tube 192 through a check valve 334 and also in flow communication with drain line 304. Drain pump 189 is therefore used solely to drain sump 150 and fine filter drain 332 is used solely to drain fine filter assembly 190. Drain pumps 189, 332 are both fed to drain line 304.

In one embodiment, drain pump 189 is de-energized when a drain cycle is initiated, and fine filter drain 332 is energized to drain sump 150 through fine filter assembly 190, thereby elongating a flush time of fine filter assembly 190 when main pump assembly 172 is energized. Drain pump 189 is then briefly energized to drain accumulated soil from sump 150. In further embodiments, drain pumps 189, 332 are cycled on and off in varying sequences, either sequentially or simultaneously to drain sump 150 and fine filter assembly 190 to meet performance objectives.

In addition, fine filter drain pump 332 facilitates independent draining of fine filter assembly 190 while main pump assembly 172 is running, such as, for example, with feedback controls in response to pressure conditions in fine filter assembly 190. Thus, for example, fine filter assembly 190 may be drained multiple times, if needed, while main pump assembly 172 continues its wash cycle. Wash cycles may therefore continue without interruption to drain fine filter assembly 190, and fine filter assembly 190 performance may be improved with more frequent draining and backflushing of filter screen grid 262 (shown in FIG. 8) through activation of fine filter drain pump 332.

Figure 16:
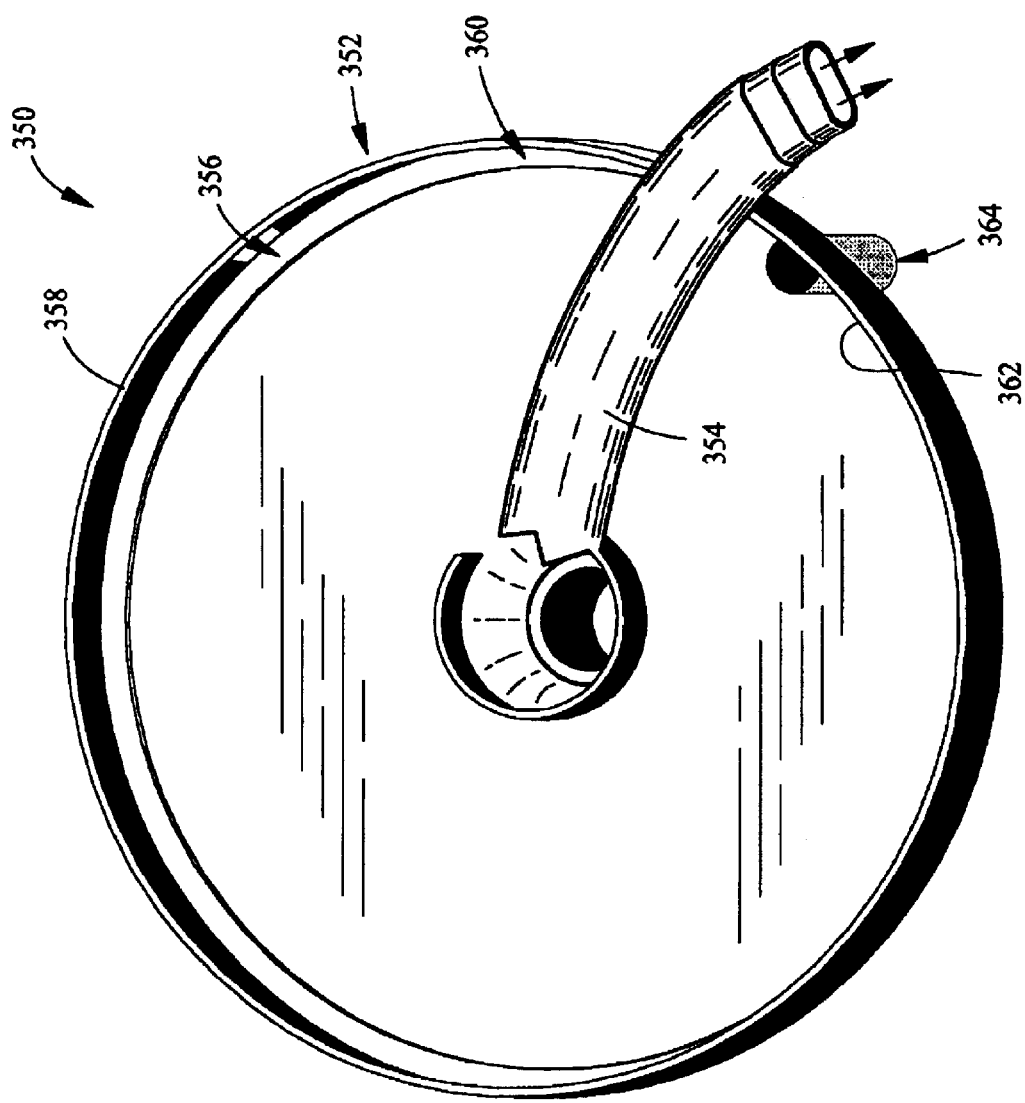
FIG. 16 is a perspective view of a second embodiment of a dishwasher fine filter assembly.

FIG. 16 is a perspective view of a second embodiment of a dishwasher fine filter assembly 350 including a filter body 352 and an integral conduit 354 for feeding wash fluid to upper regions of dishwasher chamber 106 (shown in FIG. 1). Body 352 includes a soil accumulating trough 356 extending around an outer perimeter 358 of body 352. Soil accumulating trough 356 includes a shallow end 360 in flow communication with a fine filter inlet (not shown in FIG. 16) integral to conduit 354, and a deep end 362 in flow communication with a fine filter drain tube 364. Soil accumulating trough 356 is sloped from shallow end 360 to deep end 262 and extends substantially 360 radial degrees around body outer perimeter 358, thereby producing a substantially helical flow path in soil accumulating trough 356. Because soil accumulating trough 264 extends for nearly 360 radial degrees along its helical path in fine filter body 260, a full length of filter body 352 is utilized for downward sloped soil accumulation between the fluid inlet and outlet. Consequently, the entire filter is efficiently flushed during a drain cycle. A fine filter screen material (not shown in FIG. 16) is placed over soil accumulation trough to filter fluid particles or a pre-selected size from wash fluid passing through fine filer assembly 350 in a substantially similar fashion to that described above with respect to filter assembly 190 (shown in FIGS. 3, 4, 8, 9 and 11–15).

Figure 17:
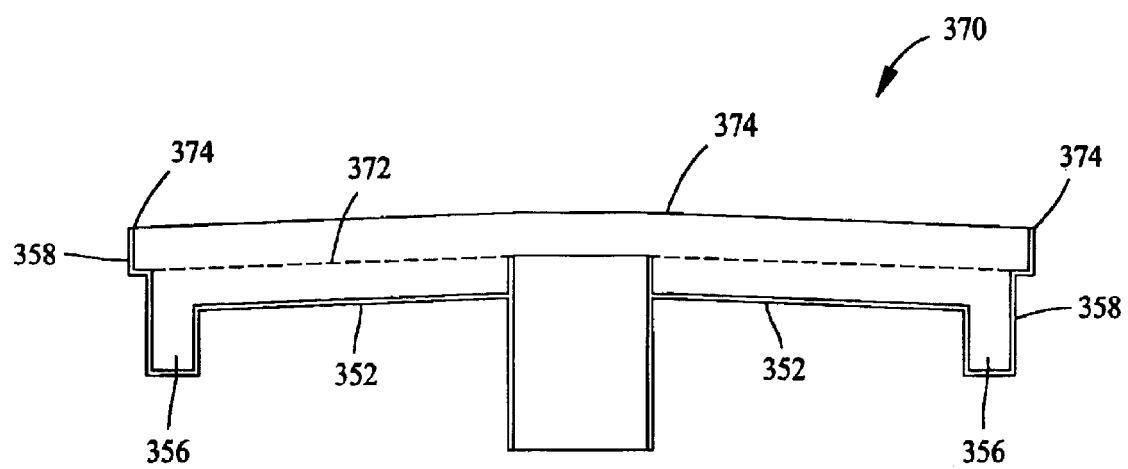
FIG. 17 is a cross sectional view of a third embodiment of a dishwasher fine filter assembly.

FIG. 17 is a cross sectional view of a third embodiment of a dishwasher fine filter assembly 370 wherein common elements of fine filter assembly 350 (shown in FIG. 16) are indicated with like reference characters. Soil accumulating trough 356 extends along an outer perimeter 358 of filter body 352. A fine filter screen 372 is disposed over filter body 352 and soil accumulating trough 356, and a weir 374 extends upward from filter body 352 along body outer perimeter 358. Weir 374 forms a barrier around body outer perimeter 358 so that fluid may pool within weir 374 to submerge fine filter screen 372 in use. The pooled fluid is suctioned through filter screen 372 when filter assembly 370 is drained, thereby facilitating cleaning and flushing of filter screen 372. When weir is properly dimensioned, fine filter assembly 370 may be flushed with a minimal amount of water, and unlike some known fine filter systems, may be located above a fluid line in tub sump portion 142 (shown in FIGS. 2–5). Fine filter assembly 370 therefore facilitates improved filter screen backflushing and minimizes an amount of fluid needed to prime main pump assembly 172 in use.

Figure 18:
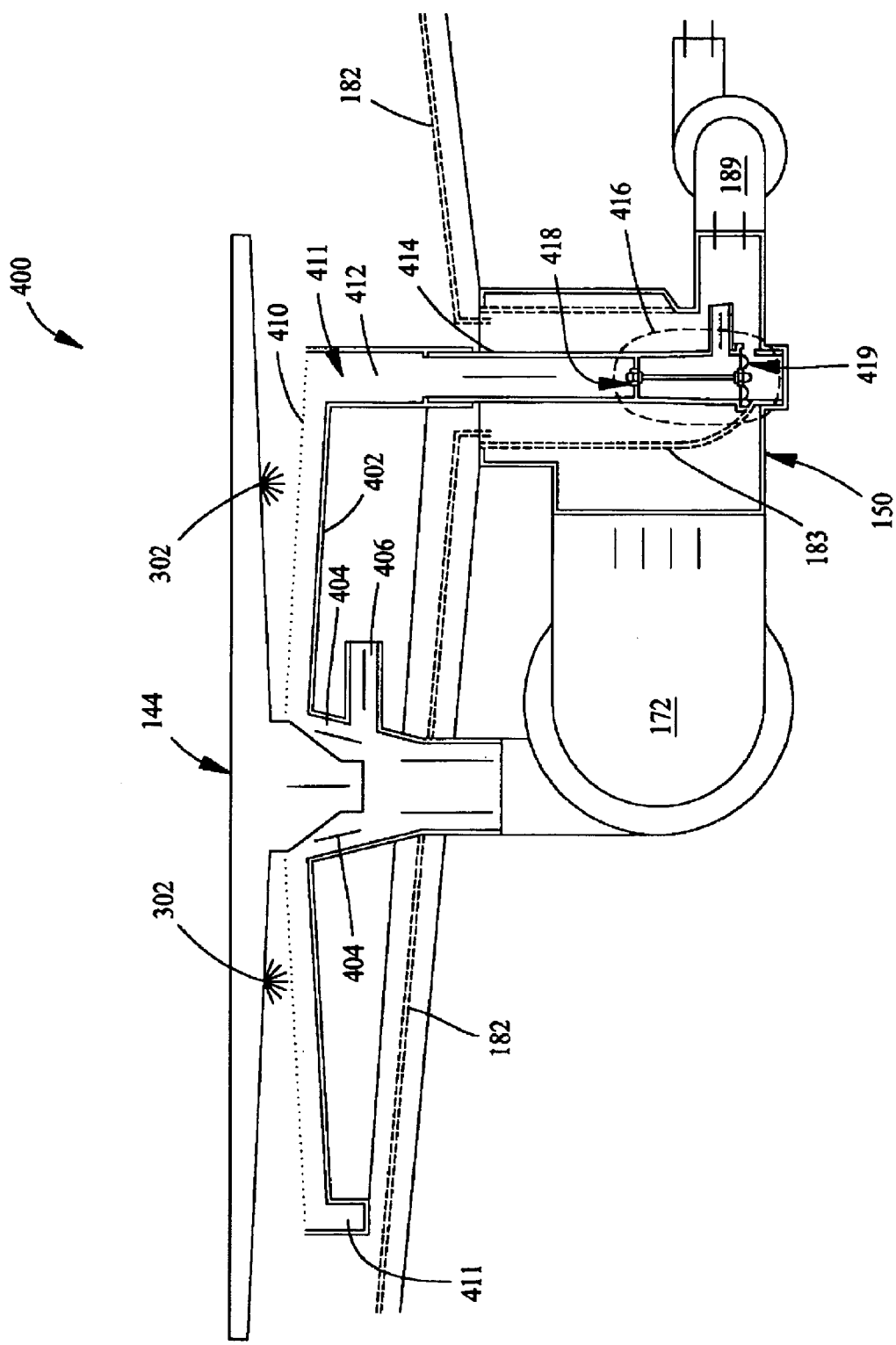
FIG. 18 is a functional schematic of a fourth embodiment of a dishwasher system.

FIG. 18 is a functional schematic of a fourth embodiment of a dishwasher system 400 wherein common elements of dishwasher system 100 (shown in FIGS. 1–13) are indicated with like reference characters. Main pump assembly 172 feeds lower spray arm assembly 144, a fine filter body 402 through spray arm bypass passages 404, and a spray arm conduit 406. Fluid in fine filter body 402 is therefore pressurized and passed through a fine filter screen 410, and particles in wash fluid too large to pass through filter screen 410 are accumulated a in helical soil accumulating trough 411 and directed toward a fine filter outlet 412. Lower spray arm assembly 144 includes downwardly directed fluid discharge ports 302 for discharging soil particles from filter screen 410 and to sweep soil particles toward fine filter outlet 412.

A fine filter drain tube 414 extends from fine filter outlet 412 and is fitted with a pressure actuated, normally closed double diaphragm valve 416. Valve 416 includes a primary diaphragm 418 and a secondary diaphragm 419. Primary diaphragm 418 is closed in normal operation when main pump assembly 172 is running to execute a wash cycle.

Because fine filter drain tube 414 is fitted with a normally closed valve 418, water entering fine filter body 402 is pressurized and may only exit through fine filter screen 410, thereby retaining all particles larger than the screen opening size. Filtration continues until the wash cycle ends and main pump assembly 172 is de-energized, thereby returning pressure in fine filter body to substantially atmospheric pressure, i.e., fine filter body 402 is depressurized. When drain pump 189 is energized, valve 418 is opened and fine filter body 402 is drained through drain tube 414, together with sump 150. Once fine filter valve 414 is opened, main pump assembly is re-energized for a predetermined time period, such as, for example, 30 seconds to backflush fine filter screen 410 and body 402. In an alternative embodiment, main pump assembly 172 is energized substantially the entire time that sump 150 is drained for an elongated fine filter flush time.

In the above-described embodiment, sump 150 and fine filter body 402 may only be drained simultaneously, and only after fine filter body 150 has been depressurized, i.e., only after main pump assembly 172 is de-energized.

Figure 19:
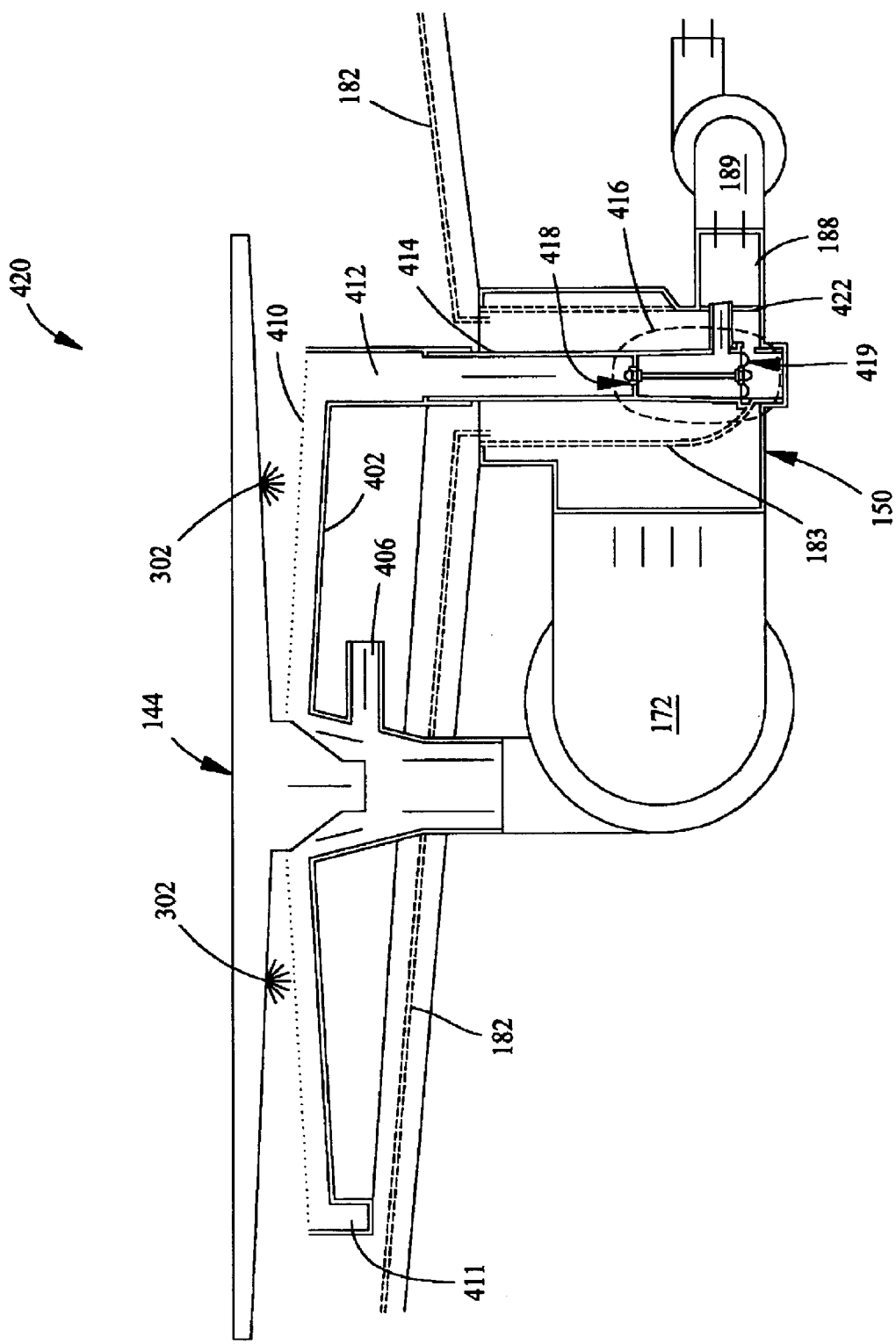
FIG. 19 is a functional schematic of a fifth embodiment of a dishwasher system.

FIG. 19 is a functional schematic of a fifth embodiment of a dishwasher system 420 wherein common components of dishwasher system 400 (shown in FIG. 18) are indicated with like reference characters. Dishwasher system 420 is substantially similar to dishwasher 400 but includes a pressure actuated flapper valve 422 fitted to fine filter drain tube 414. Flapper valve 422 allows double diaphragm valve 418 to be actuated open even while main pump assembly 172 is running by applying the full suction of drain pump 189 to fine filter drain tube 414 when flapper valve 422 is closed, thereby blocking flow communication between drain pump inlet 189 and sump 150. Fine filter body 402 can therefore be drained at any time, even when main pump assembly 172 is running. A water valve (not shown) is opened to replace the volume of water drained when draining and flushing fine filter body 402. Thus, one or more mini-fills of, for example, 0.1 or 0.2 gallons of fresh water may be employed to replace highly concentrated soiled water in fine filter assembly with an equal volume of fresh water in a variety of wash cycles to optimize water temperature, energy consumption, cycle speed, and other performance parameters.

While the invention has been described in terms of various specific embodiments, those skilled in the art will recognize that the invention can be practiced with modification within the spirit and scope of the claims.

What is claimed is:

1. A fine filter assembly for a dishwasher, said fine filter assembly comprising a filter body comprising an inlet and an outlet, said inlet located substantially adjacent said outlet, said outlet comprising a drain tube coupled to a drain line, said drain line including a fluid column generating a pressure to counterbalance an operating pressure in said fine filter assembly, said inlet and said outlet proximate an outer perimeter of said filter body, and an extended flow path joining said inlet and said outlet.

2. A fine filter assembly in accordance with claim 1 further comprising a sloped flow path extending between said inlet and said outlet.

3. A fine filter assembly in accordance with claim 2 wherein said body comprises a circular outer perimeter, said flow path extending substantially 360 radial degrees around said outer perimeter.

4. A fine filter assembly in accordance with claim 3 said flow path substantially helical between said inlet and said outlet.

5. A fine filter assembly in accordance with claim 1 wherein said drain tube is in flow communication with a drain pump suction inlet.

6. A fine filter assembly in accordance with claim 2, said flow path wider at said outlet than at said inlet.

7. A fine filter assembly in accordance with claim 1 further comprising a filter screen disposed over a top of said filter body.

8. A filter assembly in accordance with claim 1 wherein said filter body is bowl-shaped.

9. A fluid circulation assembly for a dishwasher system, said fluid circulation assembly comprising:
a main pump assembly;
a drain pump assembly in flow communication with said main pump assembly;
a fine filter assembly in flow communication with said main pump assembly and with said drain pump assembly, said fine filter assembly comprising a filter body comprising an inlet and an outlet, said outlet comprising a drain tube, said inlet and said outlet located substantially adjacent one another and proximate an outer perimeter of said filter body; and
a check valve in flow communication with said drain tube to regulate flow therethrough.

10. A fluid circulation assembly in accordance with claim 9 further comprising a sloped flow path extending between said inlet and said outlet.

11. A fluid circulation assembly in accordance with claim 10 wherein said body comprises a circular outer perimeter, said flow path extending substantially 360 radial degrees around said outer perimeter.

12. A fluid circulation assembly in accordance with claim 11, wherein said flow path substantially helical between said inlet and said outlet.

13. A fluid circulation assembly in accordance with claim 12, said body further comprising a weir extending from said outer perimeter.

14. A fluid circulation assembly in accordance with claim 9, wherein said check valve inhibits flow through said drain tube when said main pump is energized.

15. A fine filter assembly in accordance with claim 9 further comprising a filter screen disposed over a top of said filter body.

16. A filter assembly in accordance with claim 9 wherein said filter body is bowl-shaped.

17. A dishwasher system comprising:
a tub comprising a sump portion;
a fluid circulation assembly in flow communication with said sump portion, said fluid circulation assembly including a fine filter assembly, said fine filter assembly comprising a filter body comprising an inlet and an outlet, said inlet and said outlet located substantially adjacent one another and proximate an outer perimeter of said filter body; and
a pressure relief tube in flow communication with said fine filter assembly to inhibit a pressure within said fine filter assembly from exceeding a predetermined pressure.

18. A fluid circulation assembly in accordance with claim 17 further comprising a check valve in flow communication with said outlet to regulate flow therethrough.

19. A fluid circulation assembly in accordance with claim 17 wherein said body comprises a circular outer perimeter, said body defining a flow path extending substantially 360 radial degrees around said outer perimeter.

20. A fluid circulation assembly in accordance with claim 19 wherein said flow path is substantially helical.

* * * * *